United States Patent
Schwartz et al.

(10) Patent No.: US 6,472,024 B1
(45) Date of Patent: *Oct. 29, 2002

(54) PROCESS OF COATING A MINERAL MOLDING WITH AN AQUEOUS PREPARATION COMPRISING, AS FILM-FORMING CONSTITUENT, AT LEAST ONE POLYMER P

(75) Inventors: Manfred Schwartz, Frankenthal (DE); Bertold Bechert, Grünstadt (DE); Harm Wiese, Heidelberg (DE); Wolfgang Hümmer, Birkenheide (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,511

(22) Filed: Jul. 9, 1999

(30) Foreign Application Priority Data

Jul. 28, 1998 (DE) .......................................... 198 33 917

(51) Int. Cl.⁷ ............................ B05D 7/00; B01F 17/04; C04B 41/63; C08F 212/00; C08F 220/02
(52) U.S. Cl. .................... 427/445; 427/133; 427/393.6; 524/156; 524/558; 524/560; 524/563; 524/577
(58) Field of Search ................................ 524/156, 368, 524/558, 560, 563, 577; 427/393.6, 133, 445

(56) References Cited

U.S. PATENT DOCUMENTS

| | | | |
|---|---|---|---|
| 5,047,295 A | | 9/1991 | Dotzauer et al. |
| 5,356,968 A | * | 10/1994 | Rupaner et al. ............. 524/157 |
| 5,763,012 A | * | 6/1998 | Zhao et al. ............... 427/393.5 |

FOREIGN PATENT DOCUMENTS

| | | | | |
|---|---|---|---|---|
| DE | 21 48 458 | | 4/1973 | |
| DE | 26 11 614 | | 10/1976 | |
| DE | 39 01 073 | | 7/1990 | |
| DE | 4341260 | * | 5/1994 | ........... C04B/41/63 |
| EP | 0 409 459 | | 1/1991 | |
| EP | 0 469 295 | | 2/1992 | |
| GB | 1 407 827 | | 9/1975 | |
| GB | 1 501 354 | | 2/1978 | |
| WO | WO 9633143 | * | 10/1996 | ........... C04B/41/48 |

OTHER PUBLICATIONS

Translation to Reck et al. (Oct. 1996).*
Translation to Bechert et al. (May 1994).*
Derwent Abstracts, AN 96–465755/47, DE 195 14 266, Oct. 17, 1996.
Derwent Abstracts, AN 94–160239/20, DE 43 41 260, May 11, 1994.
Derwent Abstracts, AN 89–372014/51, DE 38 20 154, Dec. 20, 1989.

* cited by examiner

*Primary Examiner*—David W. Wu
*Assistant Examiner*—Kelechi C. Egwim
(74) *Attorney, Agent, or Firm*—Oblon, Spivak, McClelland, Maier & Neustadt, P.C.

(57) ABSTRACT

A method of coating a mineral molding includes applying at least one aqueous preparation to at least one surface of the molding, the aqueous preparation including:

(i) as film-forming constituent at least one polymer P which is composed of ethylenically unsaturated monomers M and which is present in dispersed form in the aqueous phase of the aqueous preparation and which has a glass transition temperature $T_G$ in the range from $-25$ to $+80°$ C.;

(ii) at least one anionic emulsifier selected from the group consisting of (a), (b), and (c):
  (a) salts of formula I:

$$\text{Alk-}\{O\text{—Et}\}_n\text{—OSO}_2\text{O}^-\text{M}^+ \qquad (I)$$

wherein
    Alk is linear or branched, saturated alkyl having from 10 to 18 carbon atoms,
    Et is 1,2-ethylene,
    n is an integer from 25 to 40, and
    $M^+$ is a monovalent cation or a cation equivalent,
  (b) mixtures of salts of formula I; and
  (c) mixtures of salts of formula I with other anionic emulsifiers, wherein the salts of formula I make up at least 80% by weight of the anionic emulsifiers; and (iii) at least one nonionic emulsifier.

8 Claims, No Drawings

PROCESS OF COATING A MINERAL MOLDING WITH AN AQUEOUS PREPARATION COMPRISING, AS FILM-FORMING CONSTITUENT, AT LEAST ONE POLYMER P

The present invention relates to aqueous preparations which comprise, as film-forming constituent, at least one polymer P which is present in dispersed form in the aqueous phase of the preparation. The present invention also relates to the use of these preparations for coating mineral moldings.

For the purposes of the present invention, mineral moldings are moldings comprising a mineral binder and mineral aggregates. The preparations made from the mineral binder and aggregates can be molded when moist, and solidify in the course of time in air or else under water, if desired with exposure to elevated temperatures, to give the desired stone-like mineral molding. Mineral binders are well known. They are finely divided inorganic materials, such as lime, gypsum, clay and/or cement. Mineral aggregates are generally granular or fibrous, naturally occurring or synthetic rock materials (gravel, sand, mineral fibers) with grain sizes or fiber lengths which are matched to the particular application in a manner known per se. In particular cases the mineral moldings also comprise metals or organic additives. Color pigments are also frequently added for coloration.

Examples of mineral moldings to be coated according to the present invention are concrete pipes, e.g. for wastewater, concrete roofing tiles (cf. for example DE-A 39 01 073), curbstones, steps, floor slabs, plinth tiles and fiber-filled concrete panels, i.e. slab-like mineral moldings which have been filled with inorganic or organic fibers, e.g. polyester fibers or nylon fibers.

A disadvantage of mineral moldings is that they lose strength on exposure to weathering (in particular exposure to water) since the cationic constituents, such as $Ca^{2+}$, are dissolved out in the course of time. Another disadvantageous property of mineral moldings is the occurrence of efflorescence phenomena. These are probably attributable to the fact that the mineral binders comprise higher-valency cations such as $Ca^{2+}$ in an alkaline environment. Reaction with the carbon dioxide from the air can therefore cause unsightly white lime markings, which have low solubility in water, to appear on the surface of the mineral moldings. Efflorescence can appear either as early as during the hardening of freshly prepared mineral moldings or else on exposure to weathering of mineral moldings which have already hardened.

To overcome the abovementioned disadvantageous properties mineral moldings are frequently given a coating. Nowadays this is usually done using aqueous coating systems whose film-forming constituent is an aqueous polymer dispersion. Conventional film-forming constituents include styrene-acrylate copolymers, homo- and copolymers of vinyl acetate, pure acrylates and the like. The coating gives the mineral moldings a glossy appearance which is desirable for many applications, in particular for concrete roofing tiles.

EP-A-469 295 and DE-A-195 14 266 have provided improvements in which the risk of efflorescence on mineral moldings is effectively removed using coating compositions based on styrene-acrylate dispersions and, respectively, pure acrylate dispersions. For this EP-A-469 295 recommends the use of a specific anionic emulsifier and DE-A-195 14 266 recommends the use of polymers which contain specific comonomers with sulfonate groups.

Prior art coatings all have the disadvantage of comparatively high water absorption. This water absorption carries with it a risk that low-molecular-weight constituents of the coating, for example emulsifiers required to stabilize the polymer particles in the coating compositions, can be washed out during prolonged weathering. This washing-out can be seen, for example, in increased white discoloration on the surface, or in embrittlement of the coating. Another consequence of this water absorption, due to the associated swelling of the polymer, is a reduction in the mechanical stability of the coating and an increase in surface slip, undesirable particularly for reasons of safety in concrete roofing tiles. A further risk with pigment-containing coatings is that the water absorption of the coating causes undesirable changes in perceived color.

It is an object of the present invention to provide coating compositions which are intended for use with mineral moldings and which give coatings having low water absorption and undergoing no disadvantageous changes in their strength and optical appearance even after prolonged exposure to moisture.

We have found that this object is achieved by preparations of film-forming polymers P which give coatings with low water absorption if the emulsifiers present in the preparations are salts of sulfuric acid monoesterified with ethoxylated $C_{10}$–$C_{20}$ alkanols.

The present invention therefore provides aqueous preparations comprising:

i. as film-forming constituent at least one polymer P which is composed of ethylenically unsaturated monomers M and which is present in dispersed form in the aqueous phase of the preparation and which has a glass transition temperature $T_G$ in the range from −25 to +80° C., and ii. at least one anionic emulsifier selected from the class consisting of the salts of formula I $$\text{Alk-[O-Et]}^n\text{—OSO}_2\text{O—M}^+ \qquad (I)$$

where

Alk is linear or branched, saturated alkyl having from 10 to 18 carbon atoms,

Et is 1,2-ethylene, n is an integer from >20 to 40, and $M^+$ is a monovalent cation or a cation equivalent, or mixtures of these salts, if desired with other anionic emulsifiers.

The invention further relates to the use of preparations of this type for coating mineral moldings.

Preferred salts of formula I are those where Alk is linear or branched alkyl having from 12 to 16 carbon atoms. n in formula I is preferably a number in the range from 25 to 40. In the case of mixtures of salts of formula I the average value of n is within the range given.

$M^+$ in formula I is preferably a cation or a cation equivalent of a metal of the 1st or 2nd main group of the Periodic Table. $M^+$ is in particular $Na^+$, $K^+$, ½ $Ca^{2+}$ or an ammonium ion ($NH_4^+$), and particularly a sodium cation. The novel preparations frequently use mixtures of salts of formula I.

A specific embodiment of the present invention relates to preparations which comprise a mixture of salts of formula I, where Alk is linear or branched alkyl having from 12 to 14 carbon atoms and the average value of n is 30. In this case $M^+$ is in particular a sodium cation.

Salts of formula I are known and commercially available, for example as DISPONIL® FES 77 (manufacturer: Henkel KGaA) or can be prepared in a manner similar to that for known salts of formula I.

Besides the salts of formula I the novel preparations may also comprise other anionic emulsifiers. However, the salts of formula I generally make up at least 30% by weight, preferably at least 50% by weight and in particular at least 60% by weight, of the total amount of anionic emulsifiers in the preparation. For low water absorption it is particularly advantageous if the salts of formula I make up at least 80% by weight of the anionic emulsifiers and in particular are the sole anionic emulsifiers.

The total amount of anionic emulsifiers is generally from 0.1 to 5% by weight, preferably from 0.2 to 4% by weight and in particular from 0.5 to 3% by weight, based on the polymer P in the aqueous dispersion.

Examples of suitable other anionic emulsifiers are selected from the class consisting of the salts, in particular the alkali metal and ammonium salts, of alkyl sulfates (alkyl: $C_8$–$C_{12}$), of sulfuric acid monoesterified with ethoxylated alkylphenols (EO number: from 3 to 50, alkyl: $C_4$–$C_9$), of alkylsulfonic acids (alkyl: $C_{12}$–$C_{18}$) and of alkylarylsulfonic acids (alkyl: $C_9$–$C_{18}$).

Another embodiment of the present invention relates to aqueous preparations whose anionic emulsifiers comprise, in addition to the salt of formula I, at least one other anionic emulsifier selected from the class consisting of the salts of formula II

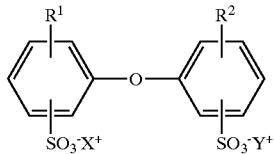

(II)

where $R^1$ and $R^2$, independently of one another, are hydrogen or linear or branched alkyl having from 4 to 24 carbon atoms and are not simultaneously hydrogen, and $X^+$ and $Y^+$ are identical or different and are a monovalent cation or a cation equivalent.

$X^+$ and $Y^+$ are preferably alkali metal cations and/or ammonium ions, in particular a sodium cation. $R^1$ and $R^2$ are preferably linear or branched alkyl having from 10 to 18 carbon atoms or hydrogen. The compounds II are well known, e.g. from EP-A 469 295. Particularly advantageous compounds II are those in which X and Y are sodium, $R^1$ is branched alkyl having 10, 12, 14 or 16 carbon atoms, in particular 12 carbon atoms, and $R^2$ is hydrogen or is identical with $R^1$. Use is frequently made of industrial mixtures having a proportion of from 50 to 90% by weight of the monoalkylated product, for example DOWFAX® 2A1 (trademark of Dow Chemical Company).

In this embodiment that which has been said above applies to the total amount of anionic emulsifier. The salts of formula I generally make up from 0.1 to 3% by weight, preferably from 0.2 to 2.0% by weight and in particular from 0.5 to 1% by weight, based on the total weight of the polymer P. The weight ratio of salt of formula I to the salt of formula II is preferably from 10:1 to 1:2, in particular from 8:1 to 1:1 and particularly from 5:1 to 2:1.

In addition to the anionic emulsifiers the novel preparations may also comprise nonionic emulsifiers. Suitable nonionic emulsifiers are nonionic araliphatic or aliphatic emulsifiers, for example ethoxylated mono-, di- or trialkylphenols (EO number: from 3 to 50, alkyl: $C_4$–$C_9$), ethoxylates of long-chain, linear or branched alkanols (EO number: from 3 to 50, alkyl: $C_8$–$C_{36}$), and also polyethylene oxide-polypropylene oxide block copolymers. Preferred nonionic emulsifiers are the abovementioned ethoxylates of long-chain alkanols, in particular those where the alkyl radical has from 12 to 20 carbon atoms and the ethoxylation number is from 10 to 40.

If the novel preparations comprise a combination of at least one anionic emulsifier and at least one nonionic emulsifier, the weight ratio of anionic to nonionic emulsifier is generally from 10:1 to 1:5, preferably from 5:1 to 1:2 and in particular from 3:1 to 1:1.

The total amount of emulsifier is generally from 0.2 to 10% by weight, preferably from 0.5 to 5% by weight and in particular from 1 to 4% by weight.

The monomers M making up the polymer P are generally selected in such a way that the polymer P is insoluble in the aqueous phase, i.e. is in dispersed form in the aqueous phase, and has a glass transition temperature of from −25 to +80° C. and forms a polymer film when the preparation is dried. Monomers M or mixtures of the monomers M which fulfil these conditions are well known to the skilled worker.

According to the present invention the monomers M preferably comprise:
  i. from 70 to 99.9% by weight of at least one monomer M1, selected from the class consisting of vinylaromatic monomers, the esters of monoethylenically unsaturated $C_3$–$C_8$ monocarboxylic acids with $C_1$–$C_{12}$ alkanols and the vinyl esters of aliphatic $C_1$–$C_{18}$ monocarboxylic acids, and
  ii. from 0.1 to 30% by weight of at least one monomer M2 copolymerizable therewith.

Examples of monomers M1 are: vinylaromatic monomers, such as styrene, α-methylstyrene, o-chlorostyrene and vinyltoluene; vinyl esters of aliphatic $C_1$–$C_{18}$ monocarboxylic acids, preferably of $C_2$–$C_{12}$ monocarboxylic acids, for example vinyl acetate, vinyl propionate, vinyl butyrate, vinyl valerate, vinyl hexanoate, vinyl 2-ethylhexanoate, vinyl decanoate, vinyl pivalate, vinyl laurate and vinyl stearate, and also the commercially available monomers VEOVA® 5–11 (VEOVA® X is a Shell trade name and indicates vinyl esters of α-branched aliphatic carboxylic acids having X carbon atoms, also known as Versatic® X acids); esters of monoethylenically unsaturated $C_3$–$C_8$ mono- or dicarboxylic acids with $C_1$–$C_{18}$ alkanols, preferably $C_1$–$C_{12}$ alkanols and in particular $C_1$–$C_8$ alkanols, or with $C_5$–$C_8$ cycloalkanols, e.g. the acrylates, such as methyl acrylate, ethyl acrylate, n-propyl acrylate, isopropyl acrylate, n-butyl acrylate, isobutyl acrylate, tert-butyl acrylate, 1-hexyl acrylate, 2-ethylhexyl acrylate and cyclohexyl acrylate, and methacrylates, such as methyl methacrylate, ethyl methacrylate, n-propyl methacrylate, isopropyl methacrylate, n-butyl methacrylate, isobutyl methacrylate, tert-butyl methacrylate, 1-hexyl methacrylate, 2-ethylhexyl methacrylate and cyclohexyl methacrylate, and also fumarates and maleates, such as dimethyl fumarate, dimethyl maleate and di-n-butyl maleate.

The monomers M1 preferably comprise at least two different monomers M1a and M1b, where the homopolymer of the monomer M1a has a higher glass transition temperature than the homopolymer of the monomer M1b. The monomer M1a is usually selected either from the class consisting of the abovementioned vinylaromatic monomers, in particular styrene, or from that consisting of the $C_1$–$C_4$-alkyl methacrylates, in particular methyl methacrylate. The monomer M1b is in both cases preferably selected from the class consisting of the abovementioned alkyl acrylates, in particular n-butyl acrylate and 2-ethylhexyl acrylate.

Typical monomer combinations M1a/M1b are:
  styrene: n-butyl acrylate in a weight ratio of from 35:65 to 80:20, particularly 55:45,
  styrene: 2-ethylhexyl acrylate in a weight ratio of from 35:65 to 80:20, particularly 59:41,
  methyl methacrylate: n-butyl acrylate in a weight ratio of from 40:60 to 80:20, particularly 55:45, methyl methacrylate: 2-ethylhexyl acrylate in a weight ratio of from 35:65 to 80:20, particularly 59:41, and also ternary and quaternary monomer mixtures M1a/M1b where some of the styrene has been replaced by methyl methacrylate and/or n-butyl methacrylate, and/or some of the n-butyl acrylate has been replaced by 2-ethylhexyl acrylate, e.g.:

methyl methacrylate: styrene: 2-ethylhexyl acrylate in a weight ratio of 20:20:60, n-butyl methacrylate: styrene: 2-ethylhexyl acrylate in a weight ratio of 35:10:55, methyl methacrylate: n-butyl methacrylate: n-butyl acrylate in a weight ratio of 30:35:35, styrene: n-butyl acrylate: 2-ethylhexyl acrylate in a weight ratio of 50:25:25, and styrene: methyl methacrylate: n-butyl acrylate 2-ethylhexyl acrylate in a weight ratio of 20:20:30:30.

Preference is also given to the polymers P in which the monomers M1 incorporated are exclusively $C_1$–$C_{10}$-alkyl methacrylates, e.g. n-butyl methacrylate as sole monomer M1.

From 90.0 to 99.8% by weight, in particular from 95.0 to 99.7% by weight and very particularly preferably from 97.0 to 99.5% by weight of the monomers M are preferably selected from the class consisting of the abovementioned monomers M1. Correspondingly, the monomers M2 copolymerizable with the monomers M1 preferably make up from 0.2 to 10% by weight, in particular from 0.3 to 5% by weight and particularly from 0.5 to 3% by weight of the monomers M.

The monomers M2 include in particular monomers with relatively high water solubility, termed monomers MW below. For the purposes of the present invention relatively high water solubility is a solubility of at least 60 g/l at 25° C. and 1 bar. The polymers P usually incorporate from 0.1 to 10% by weight, in particular from 0.2 to 5.0% by weight and very particularly preferably from 0.5 to 3.0% by weight of monomers MW.

Monomers MW include firstly monoethylenically unsaturated monomers with acid functionality. These include monoethylenically unsaturated $C_3$–$C_8$ monocarboxylic acids, such as acrylic acid, methacrylic acid, crotonic acid, vinylacetic acid, acrylamido-glycolic acid and methacrylamidoglycolic acid, monoethylenically unsaturated $C_4$–$C_8$ dicarboxylic acids, such as maleic acid, fumaric acid, itaconic acid and citraconic acid, the monoesters of these with $C_1$–$C_{12}$ alkanols, for example monomethyl maleate and mono-n-butyl maleate, and ethylenically unsaturated sulfonic acids, such as vinylsulfonic acid, 2-acrylamido-2-methylpropanesulfonic acid, 2-acryloxyethanesulfonic acid and 2-methacryloxyethanesulfonic acid, 3-acryloxy- and 3-methacryloxypropanesulfonic acid, vinylbenzenesulfonic acid and salts thereof, preferably the alkali metal salts or ammonium salts and in particular the sodium salts.

The monomers MW also include neutral monomers, e.g. the amides of ethylenically unsaturated monocarboxylic acids, such as acrylamide and methacrylamide, the hydroxyalkyl esters of the abovementioned ethylenically unsaturated mono- and dicarboxylic acids, such as hydroxyethyl acrylate, hyroxypropyl acrylate and 4-hydroxybutyl acrylate and the corresponding methacrylates, and water-soluble N-vinyllactams, such as N-vinylpyrrolidone.

A preferred embodiment of the present invention provides preparations comprising polymers P where the monomers M2 comprise, based on the total weight of the monomers M, from 0.1 to 5% by weight, in particular from 0.2 to 4% by weight and particularly from 0.4 to 2.5% by weight, of at least one monoethylenically unsaturated carboxylic acid, in particular acrylic acid, methacrylic acid and/or itaconic acid, and if desired from 0.1 to 2.5% by weight, in particular from 0.2 to 2.0% by weight, and particularly 0.25 to 1% by weight of one of the abovementioned amides of monoethylenically unsaturated carboxylic acids, in particular acrylamide or methacrylamide. Another embodiment of the present invention provides aqueous preparations comprising polymers P where the monomers M2 comprise, instead of the abovementioned ethylenically unsaturated carboxylic acids in the abovementioned embodiment, an ethylenically unsaturated sulfonic acid, in particular 2-acrylamido-2-methylpropanesulfonic acid, 2-acryloxyethanesulfonic acid, 2-methacryloxyethanesulfonic acid, or 3-acryloxy- and/or 3-methacryloxypropanesulfonic acid.

The monomers M2 also include silicon-containing monomers, preferably ethylenically unsaturated monomers containing siloxane groups, as mentioned, for example, in DE-A 195 37 935. The contents of this publication are expressly incorporated herein by way of reference in this connection. Examples of monomers containing siloxane groups are the vinyltrialkoxysilanes, e.g. vinyltrimethoxysilane, the alkylvinyldialkoxysilanes and the (meth)acryloxyalkyltrialkoxysilanes, e.g. (meth)acryloxyethyl-trimethoxysilane and (meth)acryloxypropyltrimethoxysilane. The silicon-containing monomers give improved adhesion of the coatings to mineral substrates and can be used, if desired, in amounts of from 0.05 to 2.0% by weight, preferably from 0.1 to 1.0% by weight, based on the monomers M.

According to the present invention the polymers P are substantially uncrosslinked. The monomers M2 therefore comprise, based on the monomers M, not more than 1% by weight, preferably less than 0.5% by weight, in particular less than 0.1% by weight and very particularly preferably no, polyfunctional monomers MC. Monomers MC include both monomers which have two or more ethylenically unsaturated double bonds and ethylenically unsaturated compounds having, besides an ethylenically unsaturated double bond, at least one other reactive group capable of reacting to form a bond with a functional group in the polymer or with a bi- or polyfunctional compound, for example an epoxy, N-alkylol or carbonyl group.

The polymer P in the novel preparations usually has a glass transition temperature of from −25 to +80° C., preferably from −10 to +50° C. It should be noted here that high-quality coatings are obtained only if the aqueous preparation of the film-forming polymer P has a minimum film-forming temperature which is below the usage temperature. The minimum film-forming temperature is in turn dependent on the glass transition temperature $T_G$ of the polymer P (see Ullmann's Encyclopedia of Industrial Chemistry, 5th ed., Vol. A 21, 1992, p. 169). The minimum film-forming temperature may in principle be adjusted by addition to the aqueous preparation of low-volatility external plasticizers, e.g. phthalates and/or high-volatility low-boiling organic solvents as film-forming auxiliaries.

It has proven advantageous to select a suitable glass transition temperature for the polymer P in order to match the preparations to be used according to the present invention to their respective applications. For example, for coating precast concrete products an advantageous glass transition temperature $T_G$ for the polymers P has proven to be above −10° C. and in particular above +10° C. In this embodiment of the invention the glass transition temperature $T_G$ should preferably not exceed +40° C. On the other hand for fiber-filled concrete panels, which firstly can be coated at a higher temperature and secondly should have high blocking resistance, a glass transition temperature which has proven advantageous is above +20° C. and in particular above +30° C. For the purposes of the present invention the glass transition temperature $T_G$ is the midpoint temperature determined by differential scanning calorimetry (DSC) in accordance with ASTM D 3418-82 (cf. Ullmann's Encyclopedia of Industrial Chemistry, 5th Edition, Volume A 21, VCH Weinheim 1992, p. 169 and Zosel, Farbe und Lack 82 (1976), pp. 125–134, and also see DIN 53765). The glass transition temperature may also be determined by measuring the modulus of elasticity as a function of temperature in a creep test.

According to Fox (see Ullmann's Encyclopedia of Industrial Chemistry, 4th Edition, Vol. 19, Weinheim (1980), pp. 17 and 18) the glass transition temperature $T_G$ of the polymer P can be estimated. For large molar masses a good approximation to the glass transition temperature of weakly crosslinked copolymers is given by:

$$\frac{1}{T_G} = \frac{X^1}{T_G^1} + \frac{X^2}{T_G^2} + \cdots \frac{X^n}{T_G^n}$$

where $X^1, X^2, \ldots, X^n$ are the weight fractions $1, 2, \ldots, n$ and $T_G^1, T_G^2, \ldots, T_G^n$ are the glass transition temperatures in degrees Kelvin of the respective polymers composed of only one of the monomers $1, 2, \ldots, n$. These are known for example from Ullmann's Encyclopedia of Industrial Chemistry, 5th Ed., VCH Weinheim, Vol. A 21 (1992) p. 169 or from J. Brandrup, E. H. Immergut, Polymer Handbook $3^{rd}$ Ed., J. Wiley, New York, 1989.

According to the present invention the polymer P is present in the form of an aqueous dispersion in the film-forming aqueous compositions. The polymer particles in this dispersion generally have average particle sizes of from 50 to 2000 nm, preferably from 100 to 1000 nm. Methods for adjusting the polymer particle size are known, for example, from EP-A-126 699, EP-A-567 881, EP-A-567 819, DE-A-31 47 008 and DE-A-42 13 967.

The polymers P may in principle be prepared by any process known to the skilled worker for free-radical polymerization of the monomers M. Where appropriate it may be necessary to convert the polymer P obtained in the polymerization into an aqueous dispersion for use in the novel preparations. The polymers P are preferably prepared by aqueous emulsion polymerization in the presence of at least one free-radical polymerization initiator and of at least one surface-active compound.

Possible surface-active compounds for the emulsion polymerization of the monomers M are protective colloids and emulsifiers. The surface-active compounds preferably comprise at least one anionic emulsifier of formula I and if desired one or more other anionic and/or nonionic emulsifiers. The surface-active substances used for preparation of the polymers P by emulsion polymerization preferably comprise only those emulsifiers which are also present in the finished preparation. In particular, the entire amount of the emulsifiers present in the finished preparation is used in preparing the polymers P.

It has proven advantageous for the stability of the aqueous polymer dispersions of the polymers P if they are prepared by polymerizing an aqueous emulsion of at least one ethylenically unsaturated monomer M in the presence of at least one free-radical polymerization initiator and of at least two different anionic emulsifiers, using free-radical aqueous emulsion polymerization, where the anionic emulsifiers comprise at least one salt of formula I as defined above and at least one salt of formula II as defined above. Concomitant use of nonionic emulsifiers is, of course, also possible. That which has been said above applies to the nature and amount of emulsifiers. This process, which is novel, is likewise provided by the present invention. The polymer dispersions obtainable by this process, which are also provided by the present invention, have better stability than prior art polymer dispersions. As mentioned above, the polymer films and the coatings obtainable from the polymer dispersions have markedly reduced water absorption.

The advantage of the stability of the polymer dispersions is not restricted to the polymers P according to the present invention. However, it applies particularly in the case of the polymers P according to the present invention with a glass transition temperature $T_G$ Of from −25 to +80° C. In addition, this process is preferably used to prepare polymer dispersions whose polymers P are composed of the above-mentioned monomers M1 and M2. That which has been said above applies to the nature and amount of the preferred monomers M1 and M2.

Possible free-radical polymerization initiators are any of those capable of initiating a free-radical aqueous emulsion polymerization. These may be either peroxides, e.g. alkali metal peroxodisulfates or hydrogen peroxide, or else azo compounds. Preference is given to the use of redox initiator systems which are made up of at least one organic reducing agent and at least one peroxide and/or hydroperoxide, e.g. tert-butyl hydroperoxide with a sulfur compound, e.g. sodium hydroxymethanesulfinate, sodium sulfite, sodium disulfite, sodium thiosulfate or acetone bissulfite or hydrogen peroxide with ascorbic acid. The redox initiator systems used for this purpose may also comprise a small amount of a metal compound which is soluble in the polymerization medium and whose metal component can occur in more than one valence state, e.g. iron(II) sulfate. Other preferred initiators are alkali metal peroxodisulfates, such as sodium peroxodisulfate or ammonium peroxodisulfate. The amount of the free-radical initiator systems used, based on the total amount of the monomers to be polymerized, is preferably from 0.05 to 2% by weight, particularly preferably from 0.1 to 1% by weight.

The molecular weight of the polymers may be adjusted by adding small amounts, generally up to 2% by weight, based on the monomers to be polymerized, of one or more molecular-weight-regulating substances, such as organic thio compounds, allyl alcohols or aldehydes. By using suitable regulators it is also possible to introduce silicon-containing groups into the polymer P, e.g. via mercaptoalkyltrialkoxysilanes, such as mercaptopropyltrimethoxysilane.

The emulsion polymerization may be carried out either continuously or batchwise, preferably as a semicontinuous process. The monomers to be polymerized here may be introduced to the polymerization mixture continuously, and this includes step and gradient methods. The monomers may be fed to the polymerization either as a monomer mixture or else as an aqueous monomer emulsion.

As well as the seed-free method of preparation, the emulsion polymerization may be carried out by the seed-latex method or in the presence of in-situ-prepared seed latex in order to set a specified polymer particle size. Methods for this are known and can be found in the prior art (see EP-B 40419 and Encyclopedia of Polymer Science and Technology, Vol. 5, John Wiley & Sons Inc., New York 1966, p. 847).

Polymerization pressure and polymerization temperature are of subordinate significance. The temperatures used are generally from room temperature to 120° C., preferably from 40 to 110° C. and particularly preferably from 50 to 100° C.

Following the actual polymerization reaction it may be necessary for the aqueous polymer dispersions according to the present invention to be rendered substantially free of odoriferous substances, such as residual monomers or other volatile organic constituents. This can be done in a manner known per se by physical methods via distillative removal (in particular using steam distillation) or by stripping with an inert gas. Residual monomer reduction can also be achieved chemically by free-radical postpolymerization, in particular using redox initiator systems as set out, for example, in DE-A 44 35 432, DE-A 44 19 518 and DE-A 44 35 422. The postpolymerization is preferably carried out using a redox initiator system made from at least one organic peroxide and an organic sulfite.

By this means it is possible to obtain aqueous polymer dispersions with a content of up to 80% by weight of polymer P, based on the total weight of the dispersion. For practical reasons the preparations to be used according to the present invention are preferably prepared using polymer contents of from 30 to 70% by weight, in particular from 40 to 65% by weight.

After they have been prepared and before they are used in the novel preparations the aqueous dispersions of the polymers P are preferably neutralized by using a base, e.g. ammonia, low-volatility amines, alkali metal hydroxides or alkaline-earth metal hydroxides or alkaline-earth metal oxides. The pH of the dispersions after neutralization is preferably from 6 to 9. Preference is given to neutralization with ammonia or with alkali metal hydroxides, in particular with sodium hydroxide. In the case of neutralization with sodium hydroxide it has proven advantageous for the pH after the neutralization to be from 6.8 to 8.3, in particular from 7.0 to 7.9 whereby an advanced protection against efflorescence is achievable. This advantage applies in particular if the polymers P incorporate ethylenically unsaturated carboxylic acids.

According to the present invention, the dispersions of the polymers P may be used as such, in which case the preparations comprise at least one anionic emulsifier comprising at least one salt of formula I and where appropriate one or more salts of formula II, where appropriate one or more nonionic emulsifiers, from about 10 to 60% by weight, preferably from 20 to 55% by weight, of at least one polymer P, and also generally from 0.1 to 30% by weight, preferably from 0.2 to 10% by weight and in particular from 0.5 to 5% by weight, of the auxiliaries usual for preparations of this type, and water up to 100% by weight. The novel preparations may also comprise pigment, in which case they comprise, in addition to the abovementioned amounts of the abovementioned constituents, up to 60% by weight, preferably from 10 to 50% by weight and particularly from 15 to 40% by weight, based on the total weight of the preparation, of pigments and/or finely divided fillers.

Examples of usual auxiliaries are wetting agents, fungicides, antifoams, thickeners, antifreezes, flow promoters, plasticizers and film-forming auxiliaries. Examples of film-forming auxiliaries are ethylene glycol, propylene glycol, butylene glycol, hexylene glycol, diethylene glycol, dipropylene glycol, dibutylene glycol, monoethers of these with $C_1$–$C_4$ alkanols, e.g. the monoethyl and monobutyl ethers of diethylene glycol, the monophenyl, monopropyl and monobutyl ethers of propylene glycol, the monopropyl and monobutyl ethers of dipropylene glycol, the ether acetates of these, for example diethylene glycol monoethyl ether acetate and diethylene glycol monobutyl ether acetate, propylene glycol monopropyl ether acetate and propylene glycol monobutyl ether acetate, and dipropylene glycol n-butyl ether acetate, and also alkyl esters of aliphatic mono- or dicarboxylic acids, e.g. Texanol® from Eastman Kodak, or industrial mixtures of these, e.g. Lusolvan FBH from BASF AG (di-n-butyl ester mixtures of succinic, glutaric and adipic acids). Possible plasticizers are any of the usual plasticizers suitable for dispersions, for example (oligo)propylene glycol alkylphenyl ethers, as commercially obtainable, for example, as Plastilit® 3060 from BASF AG.

The aqueous preparations to be used according to the invention may also comprise inorganic fillers and/or pigments. Examples of typical pigments are titanium dioxide, preferably in the rutile form, barium sulfate, zinc oxide and lithopones (zinc sulfide+barium sulfate). The preparations frequently comprise color pigments for decorative purposes, for example iron oxides, carbon black or graphite. Suitable fillers include aluminosilicates, such as feldspars, silicates, such as kaolin, talc and mica, magnesite, alkaline earth metal carbonates, such as calcium carbonate, for example as calcite or chalk, magnesium carbonate and dolomite, alkaline earth metal sulfates, such as calcium sulfate, and silica, etc.

In a preferred embodiment of the present invention the aqueous preparations are used as a clear coating. The content of polymer P here, based on the total weight of the preparation, is from 10 to 60% by weight, preferably from 40 to 55% by weight, and the content of auxiliaries is from 0.1 to 30% by weight, preferably from 0.5 to 10% by weight.

In another embodiment of the present invention the aqueous preparations are used in the form of preparations comprising pigment and/or filler. In this case the total content of polymer P in the aqueous preparation is preferably from 10 to 60% by weight, in particular from 20 to 40% by weight, and the content of auxiliaries is from 0.1 to 30% by weight, preferably from 0.5 to 10% by weight, and the content of fillers and/or pigments is preferably from 10 to 50% by weight, in particular from 15 to 40% by weight. The amount of pigment and/or fillers based on 100 parts by weight of polymer P in the aqueous preparation is generally from 50 to 450 parts by weight. Besides the film-forming auxiliaries and the antifoams, pigment-containing preparations will preferably also comprise a dispersing or wetting agent.

The present invention also provides a process for coating mineral moldings, which comprises applying one of the aqueous preparations described here to at least one surface of the mineral molding. This application process includes, both here and below, one or more application steps and one or more drying steps. The total amount of the aqueous preparation to be applied will generally be from 100 to 700 $g/m^2$ (when wet). This corresponds to a dry application weight of from 50 to 400 $g/m^2$. Application may be carried out in a manner known per se by spraying, troweling, doctoring, rolling or casting. The drying which generally follows each application may be carried out either at room temperature or at elevated temperature, for example at from 40 to 120° C.

In a preferred embodiment of the novel process the mineral molding is given at least two coatings. For this, a first aqueous, film-forming preparation Z1 is applied to the as yet untreated mineral molding in a first step, and where appropriate dried, and another aqueous, film-forming preparation Z2 is then applied in a second step to the molding which already has the first coating. The first step, and also the second step, may be repeated, thus giving coatings with three or more layers. The preparations Z1 and Z2 may be either identical or different.

It is important for the present invention that at least one of the film-forming preparations Z1 or Z2 is a preparation according to the present invention which comprises an emulsifier of formula I. It is preferable for both Z1 and Z2 to be preparations according to the present invention. The preparations Z1 and Z2 generally comprise polymers which are chemically similar, i.e. the monomers M of which the polymer is composed are the same or, in the case of copolymers of various monomers M, differ only in the quantitative ratios of the monomers M. However, it has proven advantageous for the preparations Z1 and Z2 to differ in that the preparation Z1 applied first has a higher pigment/filler content than the preparation Z2 applied subsequently. The difference in pigment/filler content is preferably at least 10% by weight. The pigment/filler content of the second preparation is in particular $\leq 20\%$ by weight, based on the total weight of preparation 2. Preparation 2 may also be used without any pigments. This gives particularly glossy coatings. For further details reference may also be made at this point to the earlier patent application P 198.10 052.3, the full scope of the disclosure of which is incorporated herein by way of reference.

In this embodiment it is usual to apply to the mineral molding an amount of from 70 to 400 g/m$^2$ (when wet) of preparation Z1 and an amount of from 30 to 300 g/m$^2$ of preparation Z2. The weight ratio of the amounts of preparation Z1 applied to that of preparation Z2 is usually from 4:1 to 1:2, in particular from 3:1 to 1.2:1.

In principle the novel process may be used on any molding. Its advantages according to the present invention apply in particular to moldings which comprise a mineral binder. Its preferred effects are developed in particular when the binder in the mineral moldings used (precast concrete products and fiber-filled concrete panels) comprises cement. For the purposes of the present invention precast concrete products are molded structures made from concrete and/or gas concrete, for example panels, pipes and/or roofing tiles (concrete roofing tiles). The precast concrete product is produced in a usual manner from ready-mixed concrete by an extrusion process known per se. An advantage now provided by the novel aqueous preparations is that they may be applied to the precast concrete product either when it is finished and set or when it is "green" or freshly prepared and not yet fully set.

The "green" precast concrete products coated according to the present invention may be dried in a usual manner, where appropriate at room temperature or at elevated temperature. The coated "green" precast concrete product may be introduced into a chamber where, in a setting process taking from about 6 to 24 hours at from 40 to 70° C., the concrete is set and the copolymer in the coating composition forms a film. After this process the product is preferably sprayed for a second time with the novel aqueous preparation. A further drying takes place in a tunnel oven with a circulating air temperature of about 100° C.

Mineral moldings which have already set may also be coated with the novel preparations at usual ambient temperatures, e.g. room temperature.

The advantageous properties of the novel aqueous preparations also apply in the case of mineral moldings which have been coated with a cement slurry. This cement slurry usually comprises appropriate amounts of conventional pigments, of a cement as mineral binder, of conventional auxiliaries and of water. The cement slurry may also have been modified in a known manner using polymers. It is usually applied to a mineral molding, preferably a precast concrete product, which has not yet finally set. The cement slurry layer, once set, has a thickness of from 200 to 2000 $\mu$m. The novel aqueous preparations may be applied in the manner described above.

The advantageous properties of the novel aqueous preparations are similarly apparent for fiber-filled concrete panels, i.e. slab-like mineral moldings whose binder is cement and which comprise mineral or organic fibers, e.g. polyester fibers and/or polyamide fibers as aggregates. The novel aqueous preparations are generally applied in the manner described for "green" precast concrete products.

When mineral moldings have been coated with the novel preparations the coatings absorb markedly less water when exposed to wet weathering conditions than do conventional coatings. This increases, for example, the slip resistance of the coatings. Pigment-containing preparations also exhibit markedly less discoloration than conventional coatings on exposure to wet weathering conditions. The strength of the coatings under wet weathering conditions is also increased. In addition, efflorescence is effectively prevented in the coated moldings. These properties, like the improved slip resistance, are in particular significant for concrete roofing tiles, which are therefore a preferred embodiment of the invention.

The use of the novel aqueous preparations therefore gives improved preservation of the surface of mineral moldings. The present invention also provides novel mineral moldings coated in this way.

The examples given below are intended to illustrate the present invention.

EXAMPLES

I. Preparation and Analysis of Aqueous Dispersions of the Film-forming Polymers P (Dispersions D1, D2 and D3, and Comparative Dispersions CD1, CD2 and CD3)

Glass Transition Temperature

The glass transition temperature of the polymers P was determined using DSC by the "mid-point" method (ASTM-D 3418-82).

Dispersion D1

539 g of deionized water, 15 g of emulsifier solution 1 and 5 g of emulsifier solution 2 were charged to a polymerization vessel and heated to 85° C.

An emulsion with the following composition was prepared in a feed vessel 1:

529.0 g of deionized water 22.5 g of emulsifier solution 1

70.0 g of emulsifier solution 2

780.0 g of methyl methacrylate 720.0 g of n-butyl acrylate and 15.0 g of acrylic acid.

A solution of 4.5 g of sodium peroxodisulfate in 200 g of water was prepared in a second feed vessel 2.

Maintaining the temperature at 85° C., 107 g of feed 1 and 21 g of feed 2 were added to the initial charge in a single portion in succession and allowed to react for 10 min.

Maintaining the temperature at 85° C. and starting at the same time, the remaining amounts of feed 1 and of feed 2 were then added via spatially separate feeds into the polymerization vessel over periods of, respectively, 3 h and 3.5 h. After feed 2 had ended 1 h was allowed for postpolymerization. Cooling to 25° C. was then followed by addition in succession to the polymerization vessel of 15 g of a 10% by weight aqueous tert-butyl hydroperoxide solution and 6.8 g of a 20% by weight solution of sodium hydroxymethanesulfinate and neutralization with 25% by weight aqueous ammonia solution (pH≈8.9). The solids content of the dispersion was about 52% by weight. The glass transition temperature $T_G$ was 21° C.

- Emulsifier solution 1: 20% by weight aqueous solution of $C_{16}$–$C_{18}$ alkyl-fatty alcohol ethoxylate, average ethoxylation number about 18
- Emulsifier solution 2: 30% by weight aqueous solution of the sodium salt of sulfuric acid monoesterified with an ethoxylated $C_{12}$–$C_{14}$ fatty alcohol, average ethoxylation number about 30

Dispersion CD1

534 g of deionized water, 14.1 g of emulsifier solution 1 and 6.2 g of emulsifier solution 3 were charged to a polymerization vessel and heated to 85° C.

An emulsion with the following composition was prepared in a feed vessel 1:

- 529.0 g of deionized water
- 21.0 g of emulsifier solution 1
- 40.4 g of emulsifier solution 3
- 728.0 g of methyl methacrylate
- 672.0 g of n-butyl acrylate and
- 14.0 g of acrylic acid.

A solution of 4.2 g of sodium peroxodisulfate in 200 g of water was prepared in a second feed vessel 2.

The polymerization was carried out in the manner described for dispersion D1. The pH was 7.9 and the solids content was 51.1% by weight. The glass transition temperature $T_G$ was 21° C.

- Emulsifier solution 3: 45% strength by weight aqueous solution of an agent commercially available as Dowfax® 2A1 (Dow Chemical) (mixture of mono- and di-$C_{10}$–$C_{12}$-alkyl compounds of formula I as sodium salt).

Dispersion D2

507 g of deionized water, 15 g of emulsifier solution 1 and 5 g of emulsifier solution 2 were charged to a polymerization vessel and heated to 85° C.

An emulsion with the following composition was prepared in a feed vessel 1:

- 550.4 g of deionized water
- 22.5 g of emulsifier solution 1
- 70.0 g of emulsifier solution 2
- 780.0 g of methyl methacrylate
- 720.0 g of n-butyl acrylate and
- 9.0 g of a 50% strength by weight aqueous solution of the sodium salt of 2-acrylamido-2-methylpropanesulfonate,
- 15.0 g of a 50% strength by weight aqueous acrylamide solution.

A solution of 4.5 g of sodium peroxodisulfate in 200 g of water was prepared in a second feed vessel 2.

Maintaining the temperature at 85° C., 21 g of a 50% strength by weight aqueous solution of sodium 2-acrylamido-2-methyl-propanesulfonate, 109 g of feed 1 and 21 g of feed 2 were then added to the initial charge in a single portion in succession and allowed to react for 5 min.

The polymerization was then continued in the manner described for D1. The solids content of the dispersion was about 52% by weight (pH≈8.9). The glass transition temperature $T_G$ was 21° C.

Dispersion CD2

517 g of deionized water, 14 g of emulsifier solution 1 and 6.2 g of emulsifier solution 3 were charged to a polymerization vessel and heated to 85° C.

An emulsion with the following composition was prepared in a feed vessel 1:

- 560.5 g of deionized water
- 21.0 g of emulsifier solution 1
- 40.4 g of emulsifier solution 3
- 728.0 g of methyl methacrylate
- 672.0 g of n-butyl acrylate
- 8.4 g of a 50% strength by weight aqueous solution of sodium 2-acrylamido–2-methylpropanesulfonate, and
- 14.0 g of a 50% strength by weight aqueous acrylamide solution.

A solution of 4.2 g of sodium peroxodisulfate in 200 g of water was prepared in a second feed vessel 2.

Maintaining the temperature at 85° C., 19.6 g of a 50% strength by weight aqueous solution of sodium 2-acrylamido-2-methylpropanesulfonate, 102 g of feed 1 and 21 g of feed 2 were then added to the initial charge in a single portion in succession and allowed to react for 5 min.

The polymerization was carried out in the manner described for dispersion D1. The pH was 8.1 and the solids content was 50.7% by weight. The glass transition temperature $T_G$ was 21° C.

Dispersion D3

500 g of deionized water, 38.5 g of aqueous seed dispersion (polystyrene latex, average particle size 29 nm) and 2.3 g of emulsifier solution 2 were charged to a polymerization vessel and heated to 75° C.

An emulsion with the following composition was prepared in a feed vessel 1:

- 396.8 g of deionized water
- 49.0 g of emulsifier solution 1
- 91.0 g of emulsifier solution 2
- 770.0 g of styrene
- 2.8 g of 3-methacryloyloxypropyl-1-trimethoxysilane
- 630.0 g of n-butyl acrylate
- 14.0 g of acrylic acid and
- 14.0 g of a 50% strength by weight aqueous acrylamide solution.

A solution of 4.2 g of sodium peroxodisulfate in 200 g of water was prepared in a second feed vessel 2.

20.4 g of feed 2 were then added within a period of 5 min with heating to 85° C. Maintaining the temperature at 85° C. and starting at the same time, the remaining amounts of feed 1 and of feed 2 were then added via spatially separate feeds into the polymerization vessel over periods of, respectively, 3 h and 3.5 h. After feed 2 had ended 1 h was allowed for postpolymerization. Cooling to 60° C. was then followed by addition, starting at the same time and within a period of 1 h, of 58 g of a 4.8% by weight aqueous tert-butyl hyperoxide solution and 42.6 g of a 5.9% by weight solution of sodium hydroxymethanesulfinate to the polymerization vessel. This was followed by cooling to 25° C. and neutralization with 10% strength by weight aqueous sodium hydroxide (pH≈8.2).

The solids content was 52.1% by weight. The glass transition temperature $T_G$ was 34° C.

Dispersion CD3

500 g of deionized water, 38.5 g of aqueous seed dispersion (polystyrene latex, average particle size 29 nm) and 1.6 g of emulsifier solution 3 were charged to a polymerization vessel and heated to 75° C.

An emulsion with the following composition was prepared in a feed vessel 1:

425.3 g of deionized water
49.0 g of emulsifier solution 1
60.7 g of emulsifier solution 3
770.0 g of styrene
630.0 g of n-butyl acrylate
2.8 g of 3-methacryloyloxypropyl-1-trimethoxysilane
14.0 g of acrylic acid and
14.0 g of a 50% strength by weight aqueous acrylamide solution.

A solution of 4.2 g of sodium peroxodisulfate in 200 g of water was prepared in a second feed vessel 2.

The polymerization was carried out in the manner described for dispersion D3. The pH was 7.9 and the solids content was 51.6% by weight. The glass transition temperature $T_G$ was 34° C.

II. Preparation of the Novel Preparations 1. 1000 parts by weight of each of dispersions CD1, CD2, D1 and D2 were mixed with 10 parts by weight of butyl diglycol, 5 parts by weight of an antifoam (Tego Foamex® 825 from Th. Goldschmidt AG) and 20 parts by weight of PLASTILIT® 3060 (BASF AG). This dispersion was added to an aqueous suspension made from 40 g of a commercially available filler (calcium carbonate/calcium silicate) and 10 g of iron oxide red pigment in 20 g of water. The resultant colored mixtures were allowed to age for 48 h at room temperature before their application-related properties were tested.

2. 1000 parts by weight of each of the dispersions CD3 and D3 were mixed with 40 parts by weight of an industrial mixture of di-n-butyl esters of succinic, glutaric and adipic acids, 7.5 parts by weight of an antifoam (TEGO FOAMEX® 825 from Th. Goldschmidt AG) and 20 parts by weight of PLASTILIT® 3060 (BASF AG). 392 parts by weight of each of these dispersions were added to an aqueous suspension of 382 g of a commercially available filler (calcium carbonate/calcium silicate) and 58 g of iron oxide red pigment in 168 g of water. The resultant color mixtures were allowed to age at room temperature for 48 h before their application-related properties were tested.

III. Determination of Application-related Properties

1. Water Absorption

To determine water absorption, films were cast from the preparations prepared as in II and dried for 3 days at room temperature and 24 h at 60° C. The films had a dry thickness of 500±50 μm. The resultant films were weighed, stored for 48 h in water, freed from adhering traces of water and weighed again. Table 1 gives the weight difference between the dry and the wet film in % by weight, based on the weight of the dry film.

TABLE 1

| Dispersion | Water absorption [% by weight] |
|---|---|
| CD1 | 16.8 |
| D1 | 12.7 |
| CD2 | 49.1 |
| D2 | 16.5 |
| CD3 | 20.1 |
| D3 | 10.0 |

2) To determine prevention of efflorescence in mineral moldings, the preparations prepared as in II were applied to a "green" precast concrete product*) by a spray gun (application approximately 20 g/slab; wet application rate about 320 g/m²). This was followed by drying for 2 h at 40° C. and 75% relative humidity, then for 4 h at 40° C. and 95% relative humidity. A second coating was then applied in the same way at 10 g/slab followed by drying for 8 h at 40° C. and 50% relative humidity (dry application).

*) The "green" precast concrete product used was a flat slab of dimensions 30×20×1.8 cm, produced by extruding a mortar made from sand (particle size up to 0.3 mm), cement (sand/cement ratio by weight 4:1) and water (water/cement ratio 1:2.5 by weight).

After drying, the face of the slab was placed on a water bath heated to 60° C. and left there for 7 d. The extent of efflorescence was assessed visually, using the grades given below. The results are shown in Table 4.

0=no efflorescence
1=virtually no efflorescence
2=slight efflorescence
3=moderate efflorescence
4=marked efflorescence
5=very marked efflorescence

| Dispersion | Efflorescence |
|---|---|
| CD1 | 1 |
| D1 | 0 |
| CD2 | 0–1 |
| D2 | 0–1 |
| CD3 | 0–1 |
| D3 | 0–1 |

We claim:

1. A method of coating a mineral molding, comprising applying at least one aqueous preparation to at least one surface of the molding, said aqueous preparation comprising:

(i) as film-forming constituent at least one polymer P which is composed of ethylenically unsaturated monomers M and which is present in dispersed form in the aqueous phase of the aqueous preparation and which has a glass transition temperature $T_G$ in the range from −25 to +80° C.;

(ii) at least one anionic emulsifier selected from the group consisting of (a), (b), and (c):

(a) salts of formula I:

$$\text{Alk-}\{O\text{—Et}\}_n\text{—OSO}_2\text{O}^-\text{M}^+ \qquad (I)$$

wherein
Alk is linear or branched, saturated alkyl having from 10 to 18 carbon atoms,
Et is 1,2-ethylene,
n is an integer from 25 to 40, and
$M^+$ is a monovalent cation or a cation equivalent, (b) mixtures of salts of formula I; and (c) mixtures of salts of formula I with other anionic emulsifiers, wherein the salts of formula I make up at least 80% by weight of the anionic emulsifiers; and (iii) at least one nonionic emulsifier;

wherein the weight ratio of said anionic emulsifier (ii) to said nonionic emulsifier (iii) ranges from 5:1 to 1:2;

wherein said aqueous preparation consists of, based on its total weight:

10 to 60% by weight of said at least one polymer P;

0.5 to 3% by weight of said at least one anionic emulsifier (ii), based on the weight of the polymer P;

0.1 to 6% by weight of said at least one nonionic emulsifier (iii), based on the weight of the polymer P;

0.1 to 30% by weight of conventional auxiliaries selected from the group consisting of wetting agents, fungicides, antifoams, thickeners, antifreezes, flow promoters, plasticizers and film-forming auxiliaries;

0 to 60% by weight of pigments and/or fillers; and water to 100% by weight;

and wherein the monomers M comprise as the only monomers:

(i) from 90 to 99.9% by weight of one monomer MI, selected from the group consisting of vinylaromatic monomers, esters of monoethylenically unsaturated $C_3$–$C_8$ monocarboxylic acids and $C_1$–$C_{12}$ alkanols, and vinyl esters of aliphatic $C_1$–$C_{18}$ monocarboxylic acids, and (ii) from 0.2 to 10% by weight of at least one monomer MW, selected from the group consisting of monoethylenically unsaturated $C_3$–$C_8$ monocarboxylic acids, monoethylenically unsaturated $C_4$–$C_8$ dicarboxylic acids, amides of monoethylenically unsaturated $C_3$–$C_8$ monocarboxylic acids and hydroxyalkyl esters of monoethylenically unsaturated $C_3$–$C_8$ monocarboxylic acids.

2. The method as claimed in claim 1, wherein $M^+$ in formula I is a sodium ion.

3. The method as claimed in claim 1, where the total amount of emulsifiers (ii) and (iii) is from 0.2 to 10% by weight, based on the polymer P.

4. The method as claimed in claim 1, wherein the mineral molding is selected from the group consisting of precast concrete products.

5. The method as claimed in claim 1, wherein the mineral molding is selected from the group consisting of concrete roofing tiles.

6. The method as claimed in claim 1, wherein the mineral molding is selected from the group consisting of fiber-filled concrete panels.

7. The method as claimed in claim 1, wherein the anionic emulsifier (ii) is (b) a mixture of salts of formula I, and wherein Alk is alkyl having from 12 to 14 carbon atoms and n has an average value of 30.

8. A coated mineral molding, prepared by the process as claimed in claim 1.

* * * * *